United States Patent
Marchal et al.

(10) Patent No.: US 9,829,138 B2
(45) Date of Patent: Nov. 28, 2017

(54) THERMALLY INSULATED AND HEATED DOUBLE-WALLED PIPE SEGMENT FOR FITTING BY SCREW FASTENING, AND A METHOD OF IMPLEMENTING SUCH A PIPE SEGMENT

(71) Applicants: ITP SA, Louveciennes (FR); MAJUS, London (GB)

(72) Inventors: Philippe Marchal, Vaucresson (FR); Jean-Aurélien Damour, Louveciennes (FR); Pierre Ollier, Boulogne-Billancourt (FR)

(73) Assignees: ITP SA, Louveciennes (FR); MAJUS, London (GB)

( * ) Notice: Subject to any disclaimer, the term of this patent is extended or adjusted under 35 U.S.C. 154(b) by 241 days.

(21) Appl. No.: 14/721,201

(22) Filed: May 26, 2015

(65) Prior Publication Data
US 2015/0338010 A1 Nov. 26, 2015

(30) Foreign Application Priority Data
May 23, 2014 (FR) ...................................... 14 01173

(51) Int. Cl.
| | |
|---|---|
| *F16L 53/00* | (2006.01) |
| *F16L 15/00* | (2006.01) |
| *F16L 59/14* | (2006.01) |
| *B23P 19/00* | (2006.01) |
| *F16L 9/18* | (2006.01) |

(Continued)

(52) U.S. Cl.
CPC ............. *F16L 53/005* (2013.01); *B23P 19/00* (2013.01); *F16L 9/18* (2013.01); *F16L 15/00* (2013.01); *F16L 25/01* (2013.01); *F16L 39/005* (2013.01); *F16L 53/008* (2013.01); *F16L 59/141* (2013.01); *Y10T 29/49828* (2015.01); *Y10T 29/49964* (2015.01)

(58) Field of Classification Search
USPC ............ 138/33, 32, 109, 108, 155, 148, 149
See application file for complete search history.

(56) References Cited

U.S. PATENT DOCUMENTS

| | | | | |
|---|---|---|---|---|
| 3,378,673 | A * | 4/1968 | Hopper ................. | F16L 53/008 138/149 |
| 3,440,830 | A * | 4/1969 | Wright ..................... | F16L 9/18 62/50.7 |

(Continued)

FOREIGN PATENT DOCUMENTS

| | | |
|---|---|---|
| FR | 2 921 996 A1 | 4/2009 |
| FR | 2 937 398 A1 | 4/2010 |

(Continued)

*Primary Examiner* — James Hook
(74) *Attorney, Agent, or Firm* — Oliff PLC

(57) ABSTRACT

A segment is fitted by screw-fastening for implementing a fluid transport pipe for transporting a fluid, the pipe including an inner wall and an outer wall, the segment including an inner tube and an outer tube that define an annular space between them. The segment includes in particular one heating duct placed in its annular space and opening out at either end of its annular space, the annular space being designed to be closed hermetically in order to enable it to be brought to a reduced pressure. A method of manufacturing the segment and a method of implementing the fluid transport pipe is described.

13 Claims, 7 Drawing Sheets

(51) Int. Cl.
*F16L 25/01* (2006.01)
*F16L 39/00* (2006.01)

(56) References Cited

U.S. PATENT DOCUMENTS

| | | | | |
|---|---|---|---|---|
| 3,825,035 A | * | 7/1974 | Butterweck | F16L 5/022 138/109 |
| 3,928,903 A | | 12/1975 | Richardson et al. | |
| 4,036,618 A | * | 7/1977 | Leonard | F16L 9/18 138/110 |
| 4,194,536 A | * | 3/1980 | Stine | F16L 59/145 138/103 |
| 4,415,184 A | * | 11/1983 | Stephenson | E21B 17/00 138/149 |
| 4,472,621 A | * | 9/1984 | Blackmore | F16L 53/004 137/341 |
| 4,653,541 A | * | 3/1987 | Oehlschlaeger | F16L 9/18 138/104 |
| 4,718,459 A | * | 1/1988 | Adorjan | F16L 59/141 138/105 |
| 5,390,961 A | * | 2/1995 | Guthrie | F16L 59/14 138/33 |
| 5,853,031 A | * | 12/1998 | de Oliveira | F16L 53/002 138/148 |
| 2004/0178626 A1 | * | 9/2004 | Segreto | E21B 17/042 285/47 |
| 2005/0155663 A1 | * | 7/2005 | Dhellemmes | F16L 59/029 138/149 |
| 2013/0068340 A1 | * | 3/2013 | Chakkalakal | F16L 59/143 138/149 |
| 2013/0213487 A1 | * | 8/2013 | Qu | F16L 53/008 137/13 |

FOREIGN PATENT DOCUMENTS

| | | |
|---|---|---|
| GB | 2 453 438 A | 4/2009 |
| GB | 2464800 A | 5/2010 |

* cited by examiner

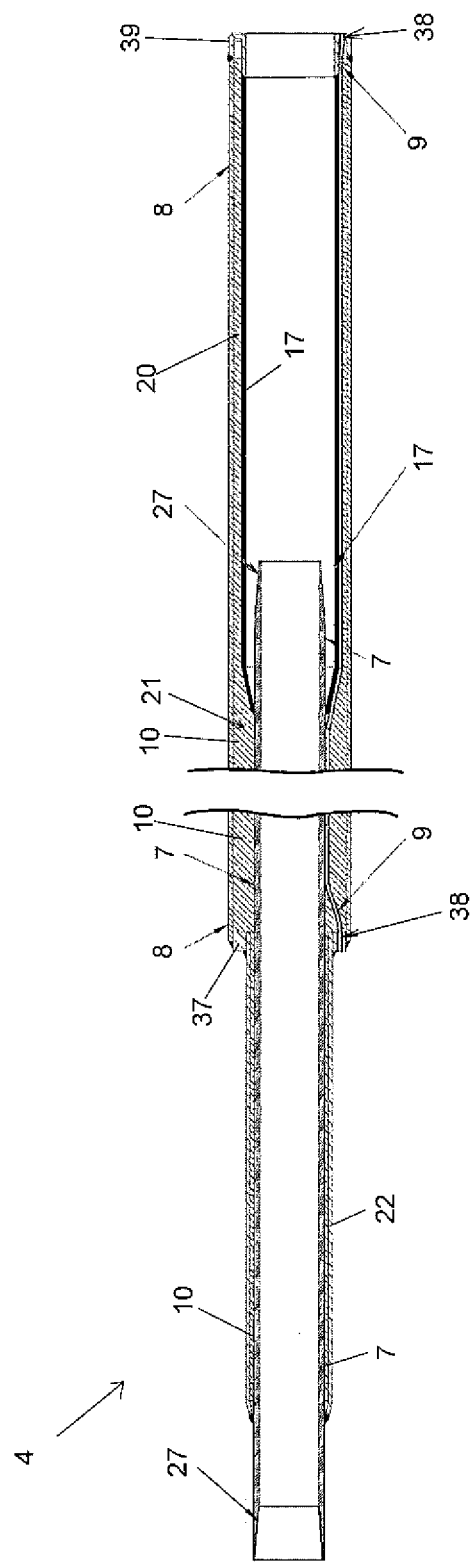

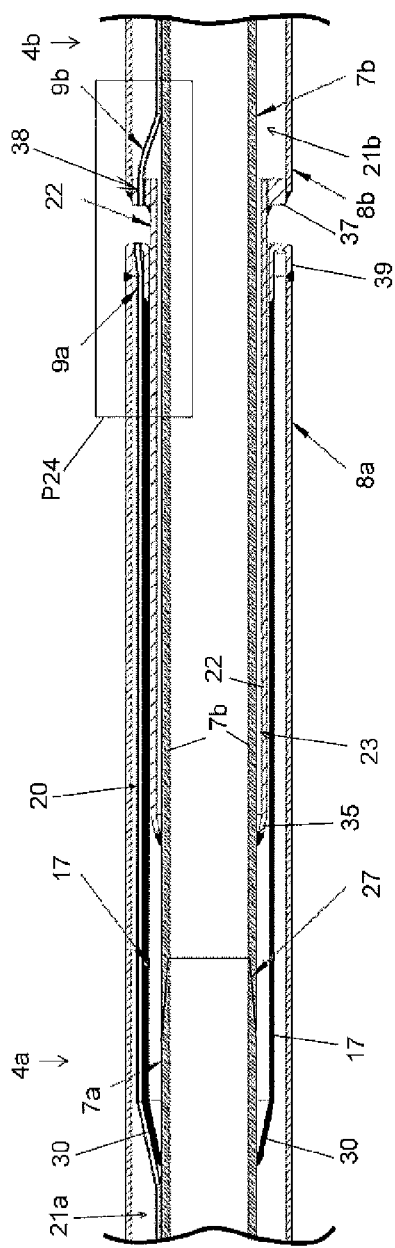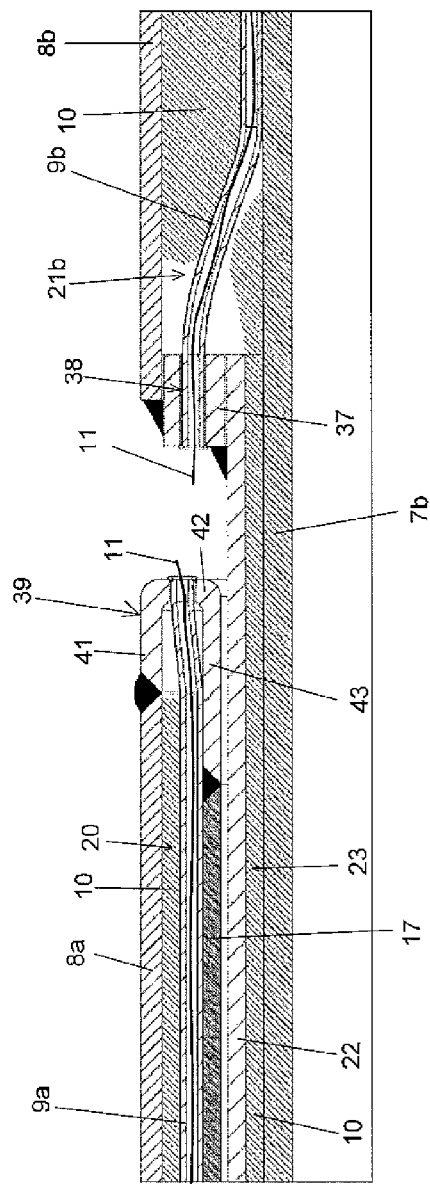

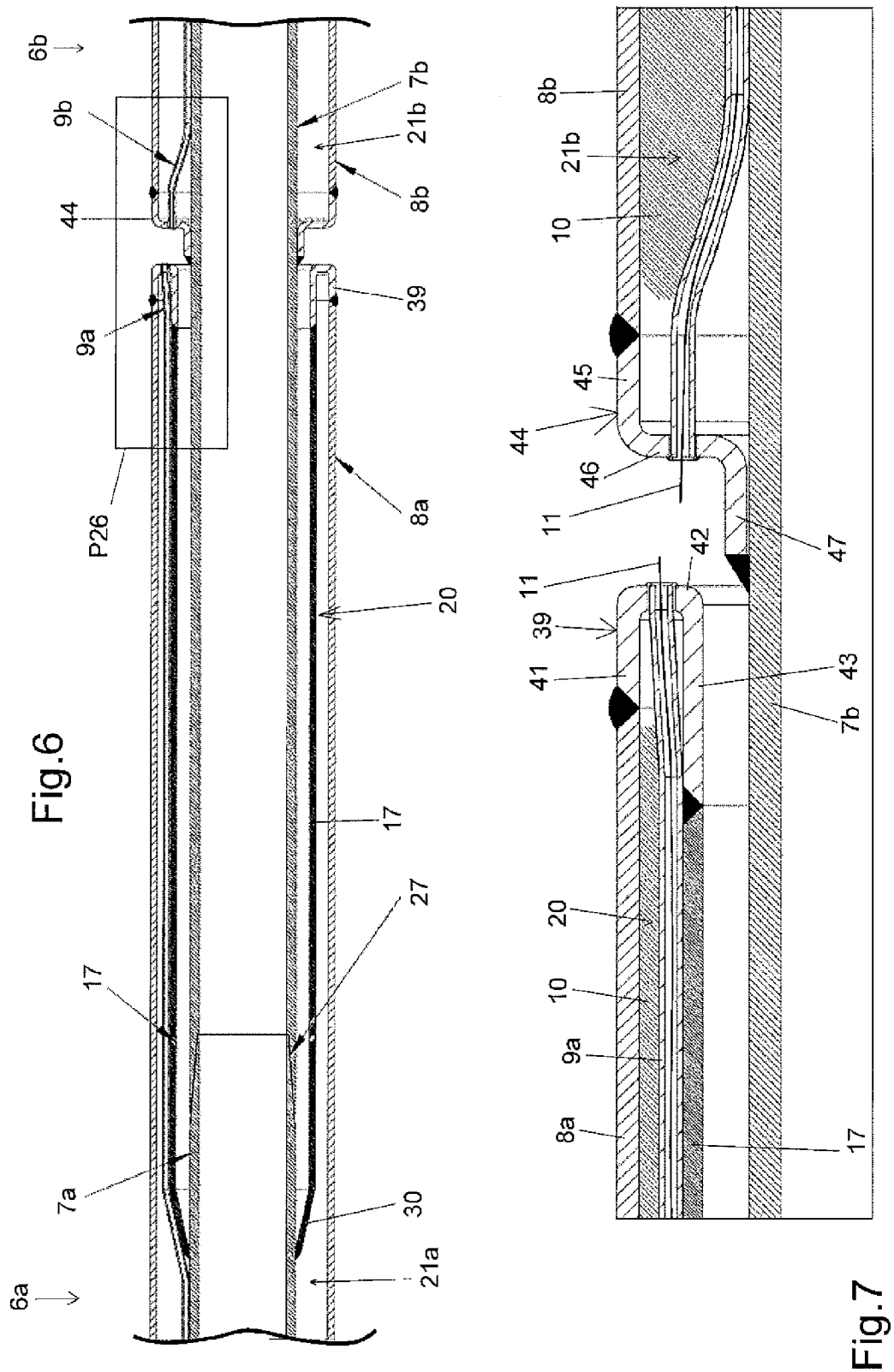

60

```
Placing an electrical heating line
in the heating duct
```

```
Screwing the threaded inner tube of the segment
to the threaded inner tube of an end segment
of a portion of the pipe that is already in place
```

```
Electrically connecting the electrical heating line
to an electrical heating line already in place
```

```
Fastening a sleeve between the outer tubes of the two segments
```

```
Filling the space between the sleeve and the inner tubes
with a filler fluid
```

```
Closing the space
defined by the sleeve and by the inner tubes
```

Fig.12

THERMALLY INSULATED AND HEATED DOUBLE-WALLED PIPE SEGMENT FOR FITTING BY SCREW FASTENING, AND A METHOD OF IMPLEMENTING SUCH A PIPE SEGMENT

FIELD OF INVENTION

The present invention relates to the technical field of pipes for transporting fluids, and in particular, pipes for transporting hydrocarbons in wells, such pipes being referred to as "tubing". The invention relates more particularly to double-walled pipes made up of segments that are screwed together end-to-end.

DESCRIPTION OF THE RELATED ART

Double-walled pipes implemented by screwing segments together end-to-end are generally used for wells. A pipe installed in a well can, for example, be disassembled once per year on average. Sometimes, a pumping system is disposed underground, at the end of the pipe, and such a system can then require disassemblies to be performed more often than once per year for servicing and maintenance operations.

U.S. Pat. No. 3,928,903 relates to a method of implementing a double-walled pipe. Each segment of that pipe is manufactured by means of threaded connectors disposed at the ends of the segment to connect its inner tube to its outer tube. Each of those tubular threaded connectors has an inner thread for connecting to the inner tube, and an outer thread for connecting to the outer tube. The segments are then fastened end-to-end by threaded rings engaging over an outer thread on each outer tube.

Patent FR-2921996 teaches of a method of implementing a double-walled pipe in which the segments are assembled together end-to-end both by mechanically guiding the segments and also by screwing them together. Insulation is disposed in the annular space between the inner wall and the outer wall, and makes it possible to provide thermal insulation that is more uniform at the joins between the segments. The annular space of each segment is, for example, dried, brought to a reduced pressure, and then closed hermetically in order to improve the insulation capacity of the insulation material placed in the annular space.

The thermal insulation facilitates extraction of the hydrocarbons from an underground deposit. It is important to avoid cooling of the crude petroleum that is being extracted because such cooling can cause paraffin to be deposited and blockages to be formed. Insulation thus makes it possible to limit heat losses.

However, any defect in the thermal insulation can cause a cold spot to appear, which then causes a blockage to be formed. Such a thermal insulation defect can, for example, result from a leak between the outside of the pipe and a portion of the annular space in which the thermal insulation material is then no longer at the reduced pressure, or is even flooded with water coming from the surrounding environment. The risk of a blockage forming is then increased.

Furthermore, a slight heat loss always occurs towards the outside of the transport pipe. When the underground deposit is at a low temperature, such slight heat losses may also cause blockages to be formed. Such slight cooling can also cause a blockage to be formed during production stoppages, during which the fluid being extracted stagnates and cools slowly inside the pipe. The risk of a blockage forming is then also increased.

When a blockage forms, it is necessary to take mechanical action or to inject chemicals in order to clear it. Such cleaning of the inner tube causes firstly a production stoppage and secondly maintenance operations that are costly for the operator of the well.

There is therefore a need to improve the structure of double-walled pipes that are assembled by screw-fastening and that can be used for extracting hydrocarbons.

SUMMARY OF THE INVENTION

An object of the present invention is to mitigate the drawbacks of the prior art by providing a novel type of segment for a double-walled pipe that is assembled by screw-fastening.

This object is achieved by means of a segment designed to be fitted by screw-fastening for implementing a fluid transport pipe for transporting a fluid, which pipe comprises an inner wall and an outer wall, the segment comprising an inner tube and an outer tube that define an annular space between them, said segment being characterized in that it further comprises at least one heating duct placed in its annular space and opening out at either end of its annular space, said annular space being designed to be closed hermetically in order to enable it to be brought to a reduced pressure.

In accordance with a feature of the invention, said heating duct opens out through passages provided through at least two closure pieces for closing off the annular space, which pieces are placed at either end of the segment and are secured to the outer tube and to the inner tube.

In accordance with another feature of the invention, said heating duct is placed against said inner tube.

In accordance with another feature of the invention, a thermal insulation material is placed in said annular space against said heating duct.

In accordance with another feature of the invention, at least one electrical heating line operating by Joule heating is placed in said heating duct and is designed to be connected to at least one electrical heating line of an adjacent segment.

In accordance with another feature of the invention, the segment has a male end portion and a female end portion, the male end portion being designed to co-operate with a female end portion of an adjacent segment.

In accordance with another feature of the invention, the female end portion has a first guide portion of diameter less than the diameter of the outer tube and greater than the diameter of the inner tube, the first guide portion being secured at one end to the outer tube and being placed inside said outer tube, the first guide portion being secured at the other end to the inner tube, the end of which is set back related to the end of the outer tube, the first guide portion co-operating with the outer tube to define a thinner annular portion that extends the annular space of the segment.

In accordance with another feature of the invention, the male end portion has a second guide portion that has an outside diameter designed to co-operate with the inside diameter of the first guide portion, the second guide portion being disposed around the inner tube, which has its end projecting relative to the outer tube, the second guide portion being secured to the inner and outer tubes of the segment and co-operating with the inner tube to define an annular space of reduced diameter that is in communication with the annular space of the segment.

In accordance with another feature of the invention, each of the ends of its inner tube has a thread for assembly to the adjacent segments.

The present invention also provides a fluid transport pipe for transporting a fluid, which pipe is made up of segments of the invention.

In accordance with another feature of the invention, the inner tubes of adjacent segments are assembled together end-to-end, the outer tubes of said adjacent segments being joined together via a sleeve that defines a closed space inside which the electrical lines are connected together.

In accordance with another feature of the invention, the sleeve is made up of two half-shells that are fastened together and to the outer tubes of the two adjacent segments.

In accordance with another feature of the invention, a filler fluid that is not electrically conductive is placed in said closed space.

The present invention also provides a method of manufacturing segments designed to be assembled together end-to-end by screw-fastening for the purpose of implementing a fluid transport pipe comprising an inner wall and an outer wall, which method comprises the following steps for fitting each segment:
- placing at least one heating duct around an inner tube;
- holding said heating duct around the inner tube by fastening means;
- placing an outer tube around the inner tube, the tubes then defining an annular space between them; and
- hermetically closing the annular space that is brought to a reduced pressure, the heating duct opening out at either end of the annular space.

The present invention also provides furthermore a method of implementing a fluid transport pipe comprising an inner wall and an outer wall, the pipe being implemented from manufactured segments of the invention, which method comprises the following steps:
- placing at least one electrical heating line in said heating duct opening out at either end of the annular space of a segment;
- screwing the threaded inner tube of this segment to the threaded inner tube of an end segment of a portion of the pipe that is already in place;
- electrically connecting said electrical heating line to at least one electrical heating line in place in the end segment;
- fastening a sleeve between the outer tubes of these two segments and filling the space between the sleeve and the inner tubes with a filler fluid that is not electrically conductive; and
- closing the space defined between the sleeve and the inner tubes.

A first advantage is that the invention thus procures a pipe having screw-fastened junctions that is thermally insulated and electrically trace heated, and for which the operating costs are low.

Another advantage is the reliability of the electric trace heating, and the ease of maintenance and repair of the electrical heating lines.

An advantage is also that it is possible to further improve the performance of pipes that have low thermal losses by means of the heating that is applied over the entire length of the segment.

Another advantage of the present invention lies in the fact that the segments are simple to assemble together, as applies for the existing segments that are described in Patent Document FR-2921996.

Another advantage of the present invention is that the segments are simple to manufacture.

Another advantage of the present invention also lies in the fact that it is possible to provide thermal insulation along the entire length of the pipe. Firstly, the electrical power necessary for the heating is low, and secondly the heating energy is supplied uniformly around the periphery of the inner tube and along said inner tube, in particular by means of the heating wires placed under the insulation. The inside temperature of the fluid is thus uniform inside the inner tube.

DESCRIPTION OF THE FIGURES

Other characteristics, advantages, and details of the invention can be better understood on reading the following supplementary description of embodiments given by way of example and with reference to the drawings, in which:

FIG. 1 is a longitudinal section view of a segment;

FIG. 2 is a longitudinal section view of the male and female ends of two adjacent segments as screwed together end-to-end;

FIG. 3 is a view of a detail of FIG. 2;

FIG. 6 is a longitudinal section view of the male and female ends of two adjacent segments as screwed together end-to-end;

FIG. 7 is a view of a detail of FIG. 6;

FIG. 12 is an example of a method of implementing the transport pipe.

DESCRIPTION OF PREFERRED EMBODIMENTS

Figure 4:
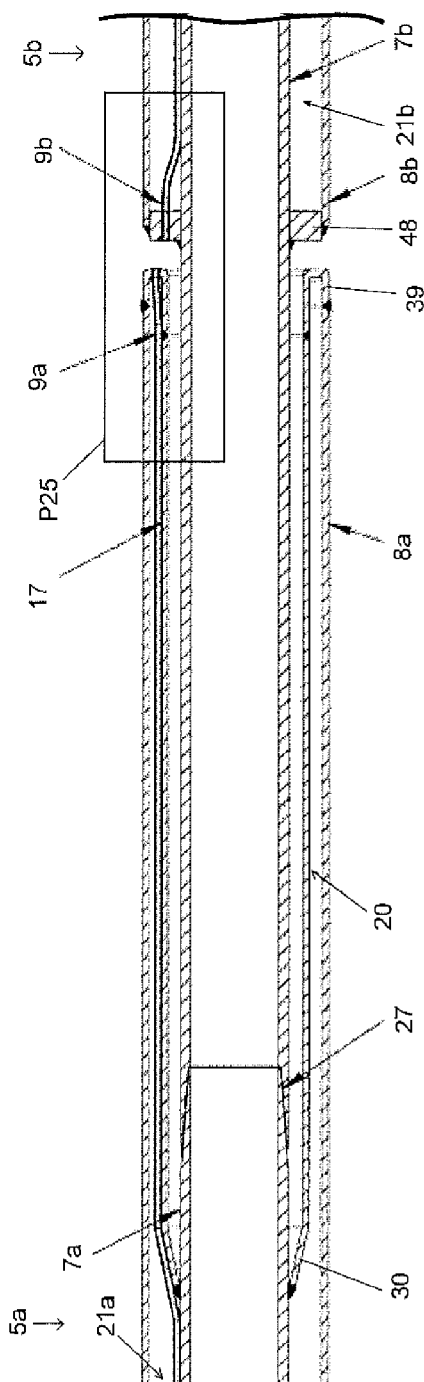
FIG. 4 is a longitudinal section view of the male and female ends of two adjacent segments as screwed together end-to-end.
Figure 5:
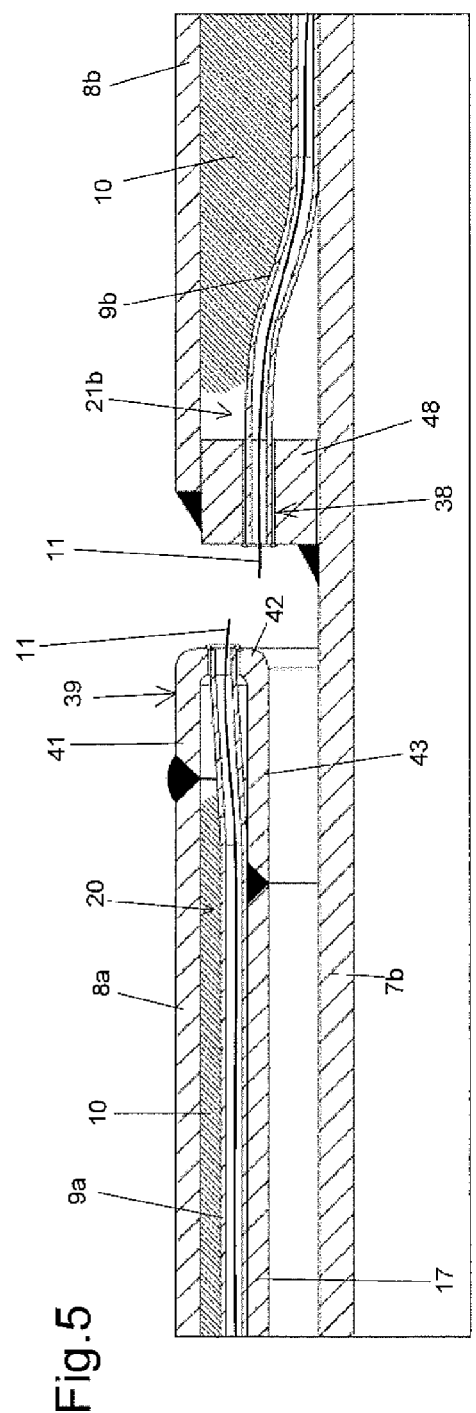
FIG. 5 is a view of a detail of FIG. 4.

The invention is described in more detail below. FIG. 1 is a longitudinal section view of a segment 4. For example, a segment may have a length lying in the range 6 meters (m) to 30 m. The segment 4 comprises an inner tube 7 and an outer tube 8, the tubes defining between them an annular space 20 in which a thermal insulation material 10 is placed.

Each of the ends of the inner tube 7 has thread 27 for assembly to the adjacent segments.

The segment has a male end portion and a female end portion. Its male end portion is designed to co-operate with a female end portion of an adjacent segment, and its female end portion is designed to co-operate with a male end portion of another adjacent segment.

The male end portion is constituted by the inner tube 7 projecting relative to the outer tube 8. The outer tube 8 is secured via its end to the inner tube 7 by a closure piece 37 serving to close off the annular space and fastened inside the outer tube 8 to close off the annular space at the same end as the male end of the segment. This closure piece 37 for closing off the annular space is secured via its inside diameter to a guide portion 22 that is an integral part of the male end portion of the segment. Said guide portion 22 co-operates with the inner tube 7 to define an annular space that is in communication with the annular space 21 of the segment 4. Said guide portion 22, which extends beyond the annular space, is also fastened to the inner tube 7.

The female end portion has a guide portion 17 of diameter that is firstly less than the diameter of the outer tube 8 and secondly greater than the diameter of the inner tube 7, and in particular greater than the diameter of the male guide portion 22.

At the female end of the segment, the outer tube 8 is fastened to a closure piece 39 serving to close off the annular space and also fastened to the female guide portion 17. Thus, this guide portion 17 is disposed inside the outer tube 8 and is secured at one end to the outer tube 8 and at the other end to the inner tube 7. The end of the inner tube 7 finds itself set back relative to the end of the outer tube 8. Said female guide portion 17 thus co-operates with the outer tube 8 to define a thinner extension 20 of the annular space of the segment.

The thermal insulation material 10 is placed throughout the annular space extending under the outer tube 8. The insulation material is also placed under the male guide portion 22.

At least one heating duct 9 is placed inside the annular space 21 and it opens out at either end of said annular space. A plurality of heating ducts 9 may be provided depending on the heating needs. Each heating duct 9 is placed against the inner tube 7. The thermal insulation material is placed in the annular space under the outer tube and against the heating duct(s) 9. Thus, the heating energy is directed towards the inner tube.

For example, the heating energy is generated from electrical energy, one or more electric heating lines being placed in the heating duct or in each of the heating ducts.

The annular space of each segment is closed hermetically and brought to a reduced pressure, in order to improve the thermal insulation of the inner tube of each segment, thereby improving the thermal insulation of the inner wall of the pipe.

The inner tube 7 is typically thermally insulated using a microporous insulation material such as IZOFLEX®. Reduced pressure in the annular space 21 increases the insulation performance of the microporous material. The pressure in this volume may lie in the range 1 millibar (mbar) to 100 mbar. This reduced pressure increases the performance of the microporous insulation.

At each end of the segment, the heating duct(s) 9 pass(es) through the annular-space closure pieces 37 and 39 via through passages 38 provided in said pieces. The closure pieces for closing off the annular space are formed symmetrically about their central axis, the passages not necessarily being disposed symmetrically. The heating ducts 9 are welded, adhesively bonded, brazed, or fitted by expanding to said closure pieces for closing off the annular space. The passages are formed facing the annular space of each segment.

Extra length may be preserved outside the annular space of each segment, or the heating ducts may open out flush with the piece through which they pass.

The annular space thus remains hermetically closed, the inside of the heating ducts 9 being not at reduced pressure. Advantageously, the electrical wires are not placed in an environment at reduced pressure, thereby reducing the risks of dielectric breakdown. Reduced pressure would degrade the electrical insulation performance of the sheathes of the electrical wires, and could give rise to a short-circuit between the electrical wires and a neighboring metal tube.

The configuration of the heating ducts also makes it possible to install the electrical wires after manufacturing of the segment is complete, thereby advantageously making it possible to avoid degrading the wires during the steps of manufacturing the segment, and in particular during a high-temperature baking stage.

In addition, in the event of failure of an electrical heating line, that line can be replaced simply over the length of the segment. It then suffices to remove the faulty line and to insert a new one into the heating duct. Replacement or repair of the electrical heating lines is thus facilitated on the heated fluid transport pipes. In addition, for such replacement operations, no intrusion is made into the annular space, and the structural integrity of said annular space is thus preserved. Such repair operations can thus be performed in situ without it being necessary to return the segment to the factory.

Also advantageously, assembly of the heating ducts by them being welded, adhesively bonded, brazed, or fitted by expanding at their ends makes it possible to avoid having to install specific components for feeding them through walls. For example, the heating ducts are made of steel. Thus, the reduced pressure in the annular space is not degraded because of leaks occurring at the wall feedthrough components, and the insulation performance remains constant.

Advantageously, the good performance of the thermal insulation that is implemented makes it possible to use electrical conductors that are of small diameter. Thus mere household-grade electrical wires are appropriate. This facilitates procurement anywhere in the world at limited cost. The thermal power to be dissipated is regulated, for example, by varying the voltage applied across the terminals of the electrical lines.

Naturally, the diameter of the conductor wires and the quantity of electrical heating lines are chosen to dissipate the necessary energy to the inner tube. The diameter of the conductors, the quantity of heating lines to be installed, and the voltage of the electrical energy are chosen, in particular, as a function of the installation dedicated to a particular use of a well. For example, it may be a well for extracting hydrocarbons or a well for extracting groundwater.

Configurations for the thermal insulation that offer particularly good performance are described below with reference to FIGS. 2 to 8.

FIG. 2 is a longitudinal section view of the male and female ends of two adjacent segments 4a and 4b as screwed together end-to-end. For reasons of clarity, the insulation material is not shown in FIG. 2, but it is shown in the detail P24 shown in FIG. 3.

The portion of inner tube 7a of the female end of the segment 4a is screwed to the portion of inner tube 7b of the male end of the segment 4b. Each segment has its annular space 20 and 21a or 21b hermetically closed and brought to reduced pressure. The female end portion includes a thinner portion 20 of the annular space that is defined by the female guide portion 17.

This guide portion 17 comprises a cylindrical portion that is coaxial with the inner and outer tubes and that is extended at one end by a tapering portion 30 that is welded or otherwise bonded to the inner tube 7a, the guide portion 17 being fastened at the other end to the closure piece 39 for closing off the annular space, which piece is secured to the outer tube 8a. This closure piece 39 for closing off the annular space comprises:

- an outer tubular portion 41 that is of the same diameter as the outer tube;
- an inner tubular portion 43 that is of the same diameter as the guide portion; and
- a portion 42 forming an annular web interconnecting the two tubular portions and through which a plurality of passages 38 are provided for the heating ducts.

This closure piece 39 for closing off the annular space is symmetrical about the central axis of the pipe and is of substantially U section.

Each heating duct 9a or 9b extends through to come substantially flush with the respective closure piece for closing the annular space. As shown in the detail in FIG. 3, the heating duct 9a passes through the annular-space closure piece 39 fastened to the guide portion 17 that is disposed inside the outer tube 8a.

In addition, the male end portion of the segment includes a guide portion 22 co-operating with the inner tube 7b to define an annular space 23 that is in communication with the annular space 21b of the segment 4b. The male guide portion 22 extends beyond the annular space. The male guide portion 22 is present, in particular, between the two ends of the outer tubes of the two adjacent segments 4a and 4b.

The male guide portion 22 comprises a cylindrical portion that is coaxial with the inner and outer tubes 7b and 8b and that is extended at one end by a tapering portion 35 that is fastened to the inner tube 7b. The cylindrical portion of this guide portion 22 is fastened at the other end to the closure piece 37 for closing off the annular space, which piece is in the form of a piece that is of section that is rectangular and symmetrical about its central axis. This annular-space closure piece is also provided with one or more passages 38 for the heating ducts.

Each heating duct thus opens out between the ends of the outer tubes 8a and 8b of two adjacent segments.

An electrical heating line 11 also extends out from and beyond each heating duct 9a and 9b and is thus ready to be electrically connected. Electrical connection and mounting of a protective sleeve is described below.

The electric trace heating consists of at least one series of electrical wires of standard type, and typically of in the range one such wire to fifteen such wires, as a function of the heat to be supplied.

The female guide portion 17 advantageously makes it possible to preserve an annular space extending over the entire length of the outer tube, in which space a thermal insulation material 10 can be placed, and said female guide portion thus makes it possible to improve the thermal insulation.

In addition, the male guide portion 22 advantageously makes it possible to provide a thermal insulation space between the two ends of the outer tubes of the two adjacent segments 4a and 4b. A thermal insulation material 10 such as a macroporous material is disposed under the male guide portion. The guide portions may also be referred to as "bayonets".

The male guide portion 22 has an outside diameter corresponding to the inside diameter of the female guide portion 17. Naturally, working clearance is provided for inserting them one into the other, the outside diameter of the male end of the guide portion being slightly less than the inside diameter of the female end of the other guide portion.

FIG. 4 is a longitudinal section view of the male and female ends of two adjacent segments 5a and 5b as screwed together end-to-end. For reasons of clarity, the insulation material 10 is not shown in FIG. 4, but it is shown in the detail P25 shown in FIG. 5.

The portion of inner tube 7a of the female end of the segment 5a is screwed to the portion of inner tube 7b of the male end of the segment 5b. Each segment has its annular space 20 and 21a or 21b hermetically closed and brought to reduced pressure.

The female end portion includes a thinner portion 20 of the annular space that is defined by the female guide portion 17. This guide portion 17 comprises a cylindrical portion that is coaxial with the inner and outer tubes and that is fastened at one end to the closure piece 39 for closing off the annular space, which piece is secured to the outer tube 8a, and that is extended at the other end by a tapering portion 30 that is fastened to the inner tube 7a.

The annular-space closure piece 39, which is of substantially U section, is, as described above with reference to FIGS. 2 and 3, made up of an outer tubular portion 41 and of an inner tubular portion 43 that are interconnected via an annular web 42 through which one or more passages are provided for one or more heating ducts.

The outer tube portion 8b of the male end portion of the segment is secured to the inner tube 7b via a closure piece 48 for closing off the annular space, which piece is symmetrical in shape about its axis and is of rectangular section.

Each heating duct 9a or 9b opens out at either end of the annular space, and flush with the respective closure pieces for closing off the annular space. As shown in detail in FIG. 5, the heating duct 9a passes through the closure piece 39 for closing off the annular space 20. The heating duct 9b passes through the closure piece 48 for closing off the annular space 21b. Each heating duct thus opens out between the ends of the outer tubes 8a and 8b of two adjacent segments.

An electrical heating line 11 also extends out from and beyond each heating duct 9a and 9b and is thus ready to be electrically connected.

Here too, the female guide portion 17 advantageously makes it possible to preserve an annular space extending over the entire length of the outer tube, in which space a thermal insulation material 10 can be placed, and said female guide portion thus makes it possible to improve the thermal insulation.

FIG. 6 is a longitudinal section view of the male and female ends of two adjacent segments 6a and 6b as screwed together end-to-end. For reasons of clarity, the insulation material 10 is not shown in FIG. 6, but it is shown in the detail P26 shown in FIG. 7.

The portion of inner tube 7a of the female end of the segment 6a is screwed to the portion of inner tube 7b of the male end of the segment 6b. Each segment has its annular space 20 and 21a or 21b hermetically closed and brought to reduced pressure.

The female end portion includes a thinner portion 20 of the annular space that is defined by the female guide portion 17. This guide portion 17 comprises a cylindrical portion that is coaxial with the inner and outer tubes and that is fastened at one end to the closure piece 39 for closing off the annular space, which piece is secured to the outer tube, and that is extended at the other end by a tapering portion 30 that is fastened to the inner tube 7a. The annular-space closure piece 39, which is of substantially U section, is, as described above with reference to FIGS. 2 and 3, made up of an outer tubular portion 41 and of an inner tubular portion 43 that are interconnected via an annular web 42 through which one or more passages are provided for one or more heating ducts.

The outer tube portion 8b of the male end portion of the segment is secured to the inner tube 7b via a closure piece 44 for closing off the annular space, which piece is symmetrical in shape about its axis and comprises:

an outer tubular portion 45 that is of the same diameter as the outer tube;

an inner tubular portion 47 of inside diameter corresponding to the outside diameter of the inner tube 7b; and a portion forming an annular web 46 interconnecting the two tubular portions and through which a plurality of passages 38 are provided for the heating ducts. This closure piece 44 for closing off the annular space is symmetrical about its central axis and is of substantially S-shaped section.

Each heating duct 9a or 9b opens out at either end flush with the respective closure pieces for closing off the annular space. As shown in detail in FIG. 7, the heating duct 9a passes through the closure piece 39 for closing off the annular space. The heating duct 9b passes through the closure piece 44 for closing off the annular space. Each heating duct thus opens out between the ends of the outer tubes 8a and 8b of two adjacent segments.

An electrical heating line 11 also extends out from and beyond each heating duct 9a and 9b and is thus ready to be electrically connected.

Here too, the female guide portion 17 advantageously makes it possible to preserve an annular space extending over the entire length of the outer tube, in which space a thermal insulation material 10 can be placed, and said female guide portion thus makes it possible to improve the thermal insulation.

Figure 11:
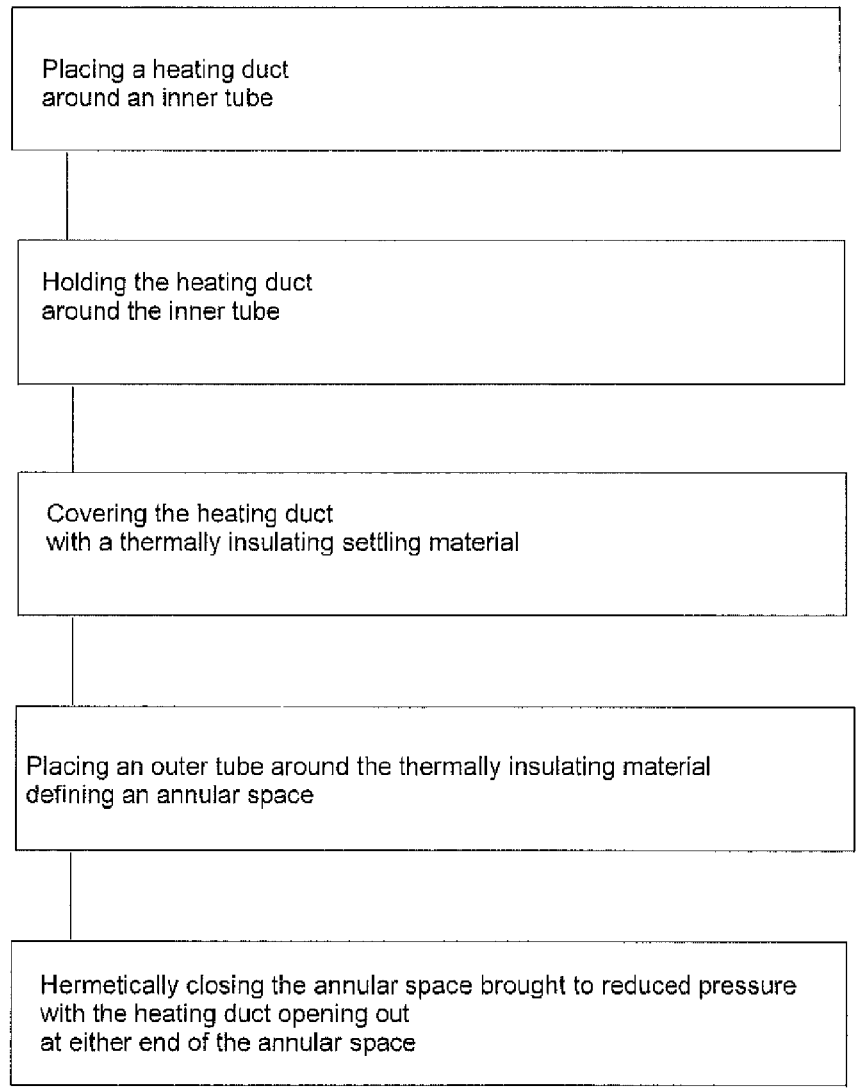
FIG. 11 is an example of a method of manufacturing a segment.

FIG. 11 shows an example of a method 50 of fitting a segment. For fitting a segment, the heating ducts are installed on the outside wall of the inner tube and held in place. The installation can be performed by equipment that pays out reels of ducting along the inner tube. Three reels of ducting may be used for simultaneously installing three heating ducts. It is also possible to provide six reels for simultaneously installing six heating ducts. The numbers of heating ducts given herein are not limiting and correspond to the numbers of reels of ducting for the heating.

The heating ducts are held against the inner tube, e.g. by means of belts or by adhesive bonding, e.g. by adhesive strips.

Panels of microporous material are then placed against the heating ducts. This material is thermally insulating and makes it possible, in particular, to settle the outer tube.

A method used for continuously applying these flat insulation panels around the tube is to use a conical shape through which the inner tube and the insulation panels are fed, as described in Patent Document FR-2937398 that teaches of an installation and of a method for continuously manufacturing a thermally insulated tube.

In this example, the insulation panels are placed around the inner tube and also around the heating ducts.

Preferably, insulation panels are chosen that withstand compression and that are slightly flexible, enabling them to adapt to fit the outlines of the heating ducts.

The guide portions or "bayonets" are then fitted and welded or otherwise bonded to the inner tube. A female guide portion extends the inner tube. Insulation panels of reduced thickness are then placed on said female guide portion.

A male guide portion is optionally placed around the inner tube. In which case, provision is made prior to that to place an insulation material of reduced thickness around the inner tube at the location at which the male guide portion is to be placed.

The outer tube is then put in place around the insulation panels and then two closure pieces for closing off the annular space are placed at either end of the segment.

The heating ducts are placed and fastened in the passages provided for that purpose through the closure pieces for closing off the annular space. The heating ducts are welded, adhesively bonded, brazed, or fitted by expanding to said closure pieces for closing off the annular space.

It is possible to provide the heating duct with extra length so that it projects at either end of the annular space, but preferably the duct stops flush with the walls defining the annular space so as to facilitate the welding, adhesive-bonding, brazing, or fitting by expansion for fastening said heating ducts.

The closure pieces for closing off the annular space are then fastened on one side to the inner tube or to the guide portion secured to said inner tube. Then the closure pieces for closing the annular space are fastened, on the other side, to the outer tube. The outer tube is then secured to the inner tube via the closure pieces for closing off the annular space.

The annular space is then hermetically closed, except for an access passage for bringing it to reduced pressure.

The segment is then baked, and then brought to a reduced pressure before the access passage is hermetically closed.

Once the annular space is closed hermetically, the electrical lines are then installed. They may also be installed subsequently during fitting of the segment.

Figure 8:
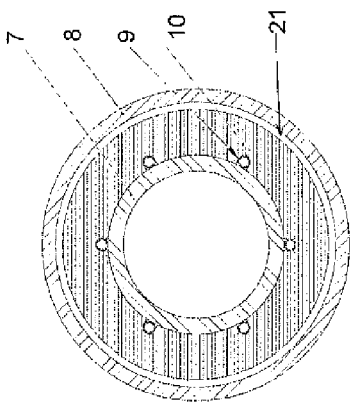
FIG. 8 is a cross-section view of a double-walled pipe.

FIG. 8 is a cross-section view of a double-walled pipe. Electrical wires are inserted into the heating ducts 9 of small diameter distributed around the circumference of the inner tube 7 and under the thermal insulation material 10.

Figure 9:
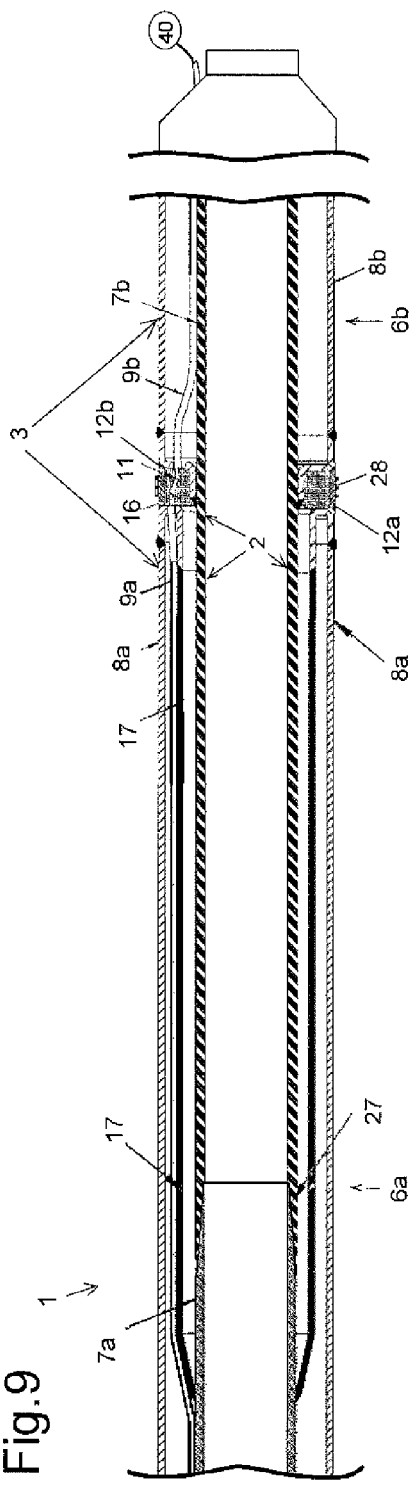
FIG. 9 is a longitudinal section view of a portion of double-walled pipe.
Figure 10:
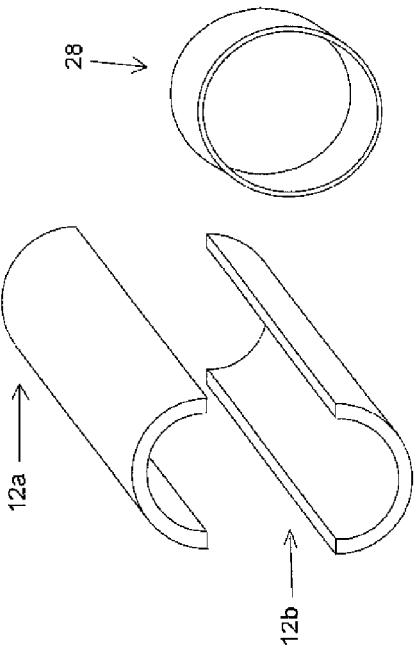
FIG. 10 is a perspective view of two half-shells and of a fastening band.

FIG. 9 is a longitudinal section view of a portion of double-walled pipe 1 comprising an inner wall 2 and an outer wall 3. The inner wall 2 of the pipe 1 is constituted by the inner tubes 7a and 7b of the segments.

The outer tubes 8a and 8b of the two adjacent segments are joined together via a sleeve defining a closed space inside which the electrical lines 11 are connected together. A filler fluid 16 that is not electrically conductive is placed in said closed space. The outer tubes 8a and 8b and the sleeves 12a and 12b constitute the outer wall 3 of the pipe 1.

For example, the sleeve is made up of two half-shells 12a and 12b that are fastened together and to the outer tubes of the two adjacent segments by means of a band 28.

FIG. 12 is an example of a method 60 of implementing a pipe. For implementing a fluid transport pipe, prior to screw-fastening a segment, electrical heating lines are put in place in the heating ducts. In order to avoid damaging the heating ducts or the electrical lines, a protective element is put in place. For example, this protective element is in the form of covering elements or of rubber strips that come to bear elastically against the electrical lines.

The segment is then screwed to an end segment of a portion of the pipe that is already in place.

Once the segment has been screwed to the other segment, electrical interconnections are performed. The electrical wires of the electrical lines are crimped in pairs between the two segments. A heat-shrink sheath may be added over the crimping in order to protect it. The segment put in place is then electrically connected to the preceding segment. The electrical lines and any extra lengths of heat ducting are then coiled around the screw-fastened connection.

A sleeve is then fastened between the outer tubes of the two segments. For example, the sleeve is in the form of two half-shells fastened by means of a clamping band 28. In particular, the sleeve makes it possible to protect the electrical connections during the descent into the well. The sleeve also limits the heat losses by convection at the connection between the segments. An under-layer of plastics material may also be added to the sleeves in order to limit the convection between the space under the sleeve and the well.

In addition, the space between the sleeve and the inner tubes is filled with a filler fluid 16 that is not electrically conductive. For example, such a filler fluid may be constituted by grease or oil.

The filler fluid prevents any other fluid from penetrating into the space under the sleeve, and into the heating ducts, and therefore limits thermal convection. In addition, a filler fluid such as grease, having thermal insulation properties that are better than those of water, makes it possible to improve the overall thermal performance further. Naturally, the space defined by the sleeve is closed after the filler fluid has been injected into it.

The pipe is then lowered into the well so that another segment can be installed.

The electrical heating lines are electrically powered by a generator 40 placed at one end of the duct.

It should be clear to the person skilled in the art that other variant embodiments of the present invention are possible. Therefore, these embodiments should be considered merely as illustrations of the invention.

What is claimed is:

1. A segment designed to be fitted by screw-fastening for implementing a fluid transport pipe for transporting a fluid, which said pipe comprises an inner wall and an outer wall, said segment comprising an inner tube and an outer tube that define an annular space between them, both ends of said inner tube having a thread for assembly to adjacent segments, wherein said segment comprises at least one heating duct placed in said annular space and opening out at either end of said annular space, said annular space being designed to be closed hermetically in order to enable it to be brought to a reduced pressure, and
    wherein at least one electrical heating line operating by Joule heating is placed in said heating duct and is designed to be connected to at least one electrical heating line of an adjacent segment when screw-fastened together.

2. The segment according to claim 1, wherein said heating duct opens out through passages provided through at least two closure pieces for closing off said annular space, said pieces are placed at either end of said segment and are secured to said outer tube and to said inner tube.

3. The segment according to claim 2, wherein said heating duct is placed against said inner tube.

4. The segment according to claim 2, wherein a thermal insulation material is placed in said annular space against said heating duct.

5. The segment according to claim 1, wherein said segment has a male end portion and a female end portion, said male end portion being designed to co-operate with a female end portion of said adjacent segment.

6. The segment according to claim 5, wherein said female end portion has a first guide portion of diameter less than the diameter of said outer tube and greater than the diameter of said inner tube, said first guide portion being secured at one end to said outer tube and being placed inside said outer tube, said first guide portion being secured at the other end to said inner tube which end is set back related to the end of said outer tube, said first guide portion co-operating with said outer tube to define a thinner annular portion that extends said annular space of said segment.

7. The segment according to claim 6, wherein said male end portion has a second guide portion that has an outside diameter designed to co-operate with the inside diameter of said first guide portion, said second guide portion being disposed around said inner tube which has its end projecting relative to said outer tube, said second guide portion being secured to said inner and outer tubes of said segment and co-operating with said inner tube to define an annular space of reduced diameter that is in communication with said annular space of said segment.

8. A fluid transport pipe for transporting a fluid, which pipe is made up of adjacent segments designed to be fitted by screw-fastening for implementing a fluid transport pipe for transporting a fluid, which said pipe comprises an inner wall and an outer wall, said segment comprising an inner tube and an outer tube that define an annular space between them, both ends of said inner tube having a thread for assembly to adjacent segments, wherein said segment comprises at least one heating duct placed in said annular space and opening out at either end of said annular space, said annular space being designed to be closed hermetically in order to enable it to be brought to a reduced pressure, and
    wherein at least one electrical heating line operating by Joule heating is placed in said heating duct and is designed to be connected to at least one electrical heating line of an adjacent segment when screw-fastened together.

9. The transport pipe according to claim 8, wherein said inner tubes of said adjacent segments are assembled together end-to-end, said outer tubes of each of said adjacent segments being joined together via a sleeve that defines a closed space inside which said electrical lines are connected together.

10. The transport pipe according to claim 9, wherein said sleeve is made up of two half-shells that are fastened together and to said outer tubes of two adjacent segments.

11. The transport pipe according to claim 9, wherein a filler fluid that is not electrically conductive is placed in said closed space.

12. A method of manufacturing segments designed to be assembled together end-to-end by screw-fastening for the purpose of implementing a fluid transport pipe comprising an inner wall and an outer wall, which method comprises the following steps for fitting each segment:
    placing at least one heating duct around an inner tube, both ends of said inner tube having a thread for assembly to adjacent segments and configured such that at least one electrical heating line in said heating duct is connected to at least one electrical heating line of an adjacent segment when screw-fastened together;
    holding said heating duct around the inner tube by fastening means;
    placing an outer tube around said inner tube, said outer and inner tubes then defining an annular space between them; and
    hermetically closing said annular space that is brought to a reduced pressure, said heating duct opening out at either end of said annular space.

13. A method of implementing a fluid transport pipe comprising an inner wall and an outer wall, said pipe being implemented from manufactured segments as to claim 12, which method comprises the following steps:
    placing at least one electrical heating line in said heating duct opening out at either end of said annular space of a first segment of said segments;
    screwing said threaded inner tube of said first segment to said threaded inner tube of an end segment of a portion of said pipe that is already in place;
    electrically connecting said electrical heating line to at least one electrical heating line in place in said end segment of said segments;
    fastening a sleeve between said outer tubes of these said two segments and filling the space between said sleeve and said inner tubes with a filler fluid that is not electrically conductive; and closing said space defined between said sleeve and said inner tubes.

\* \* \* \* \*